United States Patent [19]
Miyoshi et al.

[11] Patent Number: 5,927,698
[45] Date of Patent: Jul. 27, 1999

[54] LIQUID SEALED-TYPE VIBRATION INSULATING DEVICE

[75] Inventors: Keiji Miyoshi, Inazawa; Tatsuo Suzuki, Aichi-ken, both of Japan

[73] Assignee: Toyoda Gosei Co., Ltd., Aichi-ken, Japan

[21] Appl. No.: 08/899,567

[22] Filed: Jul. 24, 1997

[30] Foreign Application Priority Data

Jul. 24, 1996 [JP] Japan ..................................... 8-214233
Mar. 26, 1997 [JP] Japan ..................................... 9-092933

[51] Int. Cl.$^6$ ....................................................... F16F 5/00
[52] U.S. Cl. ...................................................... 267/140.13
[58] Field of Search ......................... 267/140.12, 140.13, 267/140.14, 217, 219, 35, 64.19, 64.23, 64.27, 293, 140.11

[56] References Cited

U.S. PATENT DOCUMENTS

| | | | |
|---|---|---|---|
| 2,220,581 | 11/1940 | Piron .......................................... | 267/35 |
| 4,750,719 | 6/1988 | Hartel . | |
| 4,834,348 | 5/1989 | Jordens et al. ...................... | 267/140.13 |
| 4,921,049 | 5/1990 | Kaiser et al. ....................... | 267/140.13 |
| 5,127,636 | 7/1992 | Spaltofski .......................... | 267/140.13 |
| 5,316,275 | 5/1994 | Maeno et al. ....................... | 267/140.13 |
| 5,516,176 | 5/1996 | Kimoto et al. ......................... | 216/35.1 |
| 5,543,470 | 8/1996 | Nakata et al. ........................ | 525/331.7 |
| 5,630,573 | 5/1997 | Suzuki et al. ....................... | 267/140.13 |
| 5,845,895 | 12/1998 | Nakada et al. ....................... | 267/140.13 |

FOREIGN PATENT DOCUMENTS 7-114388  5/1995  Japan .

*Primary Examiner*—Robert J. Oberleitner
*Assistant Examiner*—Melanie Talavera
*Attorney, Agent, or Firm*—Pillsbury Madison & Sutro LLP

[57] ABSTRACT

A liquid sealed-type vibration-insulating device includes an upper connection member to be mounted on a vibrating member; a lower connection member of a cup-shape to be mounted on a member on a vehicle body; a vibration-insulating rubber member provided between the upper and lower connection members; an annular plate fixedly secured to a lower portion of the vibration-insulating rubber member; a tubular metal member connecting the annular plate to an upper open end of the lower connection member; a heat-resistant rubber sheet member connected between an upper open end of the tubular metal member and the upper connection member; a main liquid chamber formed by the vibration-insulating rubber member and the lower connection member; an auxiliary liquid chamber formed by the vibration-insulating rubber member and the heat-resistant rubber sheet member; an orifice communicating the main liquid chamber with the auxiliary liquid chamber; and a stopper member which is connected to the upper connection member and is located within the main liquid chamber. The stopper member abuts against the annular plate and a bottom of the lower connection member which serves as a stopper mechanism operative in upward and downward directions. The stopper also abuts against a side wall of the lower connection member which serves as a stopper mechanism operative in a radial direction.

8 Claims, 5 Drawing Sheets

LIQUID SEALED-TYPE VIBRATION INSULATING DEVICE

BACKGROUND OF THE INVENTION

The present invention relates to a liquid sealed-type vibration-insulating device. Particularly, the present invention relates to a liquid sealed-type vibration-insulating device having an interior divided into a main liquid chamber and an auxiliary liquid chamber by a vibration-insulating rubber member constituting a main spring.

Among vibration-insulating devices, an engine mount for an automobile is used under various conditions ranging from idling operation to maximum engine speed, and, therefore, must deal with a wide range of engine frequencies. For example, a vibration-insulating device for dealing with this situation is U.S. Pat. No. 4,750,719. This discloses a liquid sealed-type engine mount wherein the interior is divided into two liquid chambers by a vibration-insulating rubber member in which the two liquid chambers communicate with each other through an orifice. In such a liquid sealed-type engine mount, a stopper mechanism for limiting excessive displacement is needed and in view of the situation in which the engine mount is used, the engine mount must be as compact as possible. In the liquid sealed-type engine mount disclosed in the above U.S. patent, the stopper mechanism is composed of a flange of a body on the inside of the vibration-insulating device and a cap located on the outside of the vibration-insulating device body. However, no reduction of dimensions of the vibration-insulating device, and particularly no reduction of its dimension in a radial direction, have been taken into consideration.

SUMMARY OF THE INVENTION

An object of the present invention is to provide a liquid sealed-type vibration-insulating device which can effectively deal with a wide range of frequencies. In addition, both height and radial dimensions are reduced and a stopper mechanism for limiting an excessive displacement is furnished.

According to the present invention, a liquid sealed-type vibration-insulating device comprising the following is provided:

an upper connection member mounted on a vibrating member;

a lower connection member of a cup-shape mounted on a member on a vehicle body;

a vibration-insulating rubber member located receiving vibrations from the vibrating member between the upper and lower connection members;

an annular plate affixed to a lower portion of the vibration-insulating rubber member;

a tubular metal member connecting the annular plate to an upper open end of the lower connection member;

a heat-resistant rubber sheet member which is connected between an upper open end of the tubular metal member and the upper connection member which covers the vibration-insulating rubber member;

a main liquid chamber formed by the vibration-insulating rubber member and the lower connection member and is located beneath the vibration-insulating rubber member;

an auxiliary liquid chamber formed by the vibration-insulating rubber member and the heat-resistant rubber sheet member surrounding an upper side of the vibration-insulating rubber member;

a liquid filled in the main liquid chamber and the auxiliary liquid chamber;

an orifice allowing communication between the main liquid chamber and the auxiliary liquid chamber; and a stopper member connected to the upper connection member and located within the main liquid chamber, wherein the stopper member abuts against the annular plate and the bottom of the lower connection member which serves as a stopper mechanism operative in upward and downward directions, and also abuts against a side wall of the lower connection member which serves as a stopper mechanism operative in a radial direction.

A protector, made of an elastic material, can be formed integrally with the heat-resistant rubber sheet member on an outer side of the heat-resistant rubber sheet member.

The stopper member, located within the main liquid chamber, abuts against the annular plate and the bottom of the lower connection member which serves as a stopper mechanism operative in the upward and downward directions, and also abuts against the peripheral wall of the lower connection member which serves as a stopper mechanism operative in the radial direction. Therefore, there is no need to provide any stopper mechanism on the outside of the vibration-insulating device body, and the vibration-insulating device can be made compact. In addition, the stopper member and the side wall of the lower connection member cooperate with each other to form an annular orifice; therefore, even high-frequency vibrations can be dealt with. Furthermore, by forming the protector integrally with the heat-resistant rubber sheet member, damage to the rubber sheet member by a splashed stone can be prevented without a separate protector.

Other objects, features and characteristics of the invention will become apparent upon consideration of the following description and the appended claims with reference to the accompanying drawings, all of which form a part of this specification and wherein like reference numerals represent corresponding parts in the various views.

DESCRIPTION OF THE PREFERRED EMBODIMENTS

Figure 1:
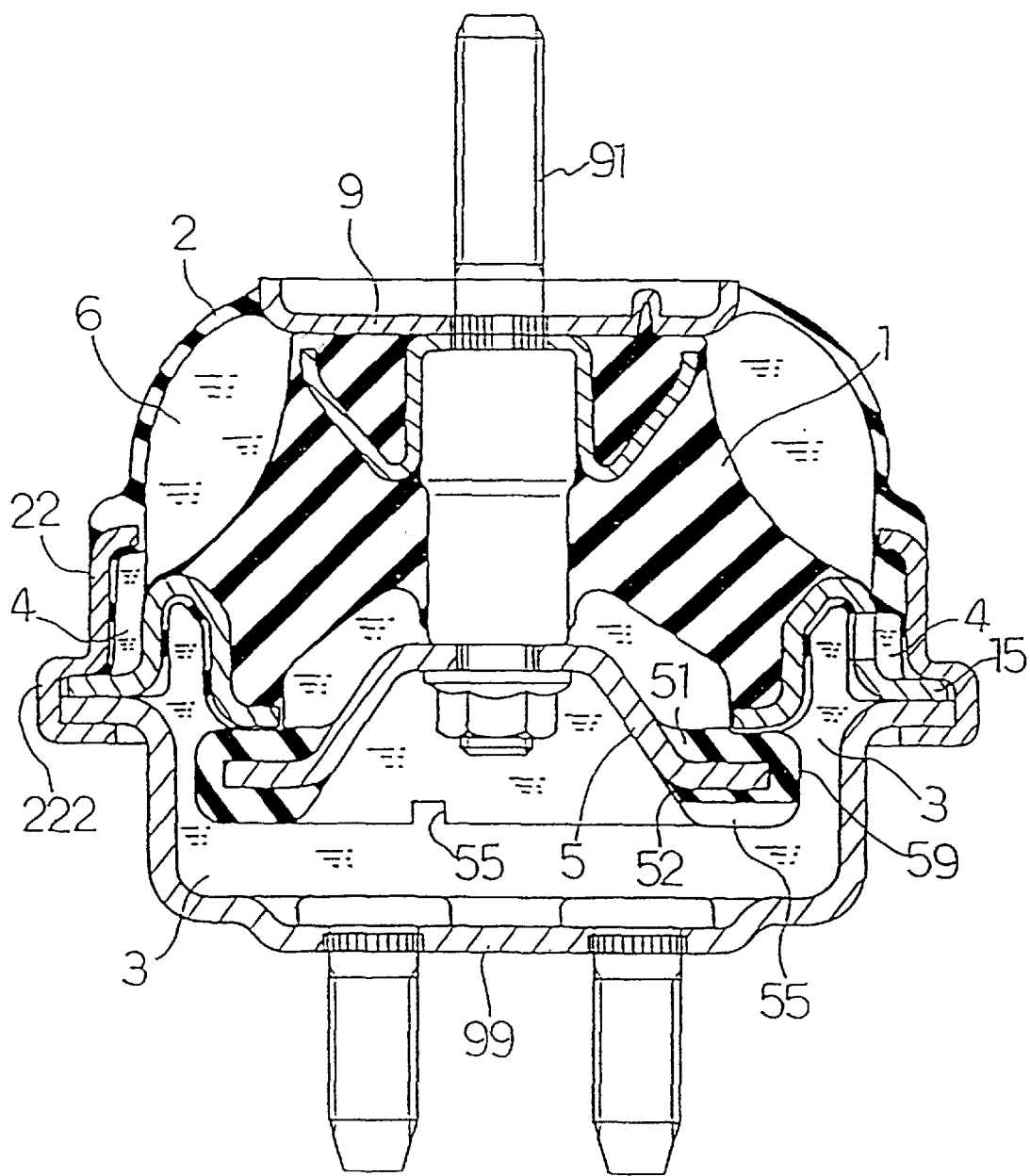
FIG. 1 is a vertical cross-sectional view of one preferred embodiment of a liquid sealed-type vibration-insulating device of the present invention.

One preferred embodiment of a liquid sealed-type vibration-insulating device of the present invention will now be described with reference to FIGS. 1 to 3. The liquid sealed-type vibration-insulating device includes an upper connection member 9, mounted on a vibrating member, a lower connection member 99, having a cup-shape, is mounted to a vehicle body, a vibration-insulating rubber member 1 is located between the upper and lower connection members 9 and 99, respectively, for receiving vibrations from the vibrating member. The vibration-insulating device also includes an annular plate 15 affixed to a lower portion of the vibration-insulating rubber member 1 and a tubular metal member 22 connects the annular plate 15 to an upper open end (mouth portion) of the lower connection member 99. A heat-resistant rubber sheet member 2, which is connected between an upper open end of the tubular metal member 22 and the upper connection member 9, covers the vibration-insulating rubber member 1. A main liquid chamber 3 which is formed by the vibration-insulating rubber member 1 and the lower connection member 99, is located beneath the vibration-insulating rubber member 1. An auxiliary liquid chamber 6, which is formed by the vibration-insulating rubber member 1 and the heat-resistant rubber sheet member 2, surrounds the upper side of the vibration-insulating rubber member 1. A liquid filled in the main liquid chamber 3 and the auxiliary liquid chamber 6 are also provided together with an orifice 4 allowing communication between the main liquid chamber 3 and the auxiliary liquid chamber 6. Finally, a stopper member 5, which is connected to the upper connection member 9 by a connecting bolt 91, and is located within the main liquid chamber 3.

The stopper member 5 abuts against the annular plate 15 and a bottom of the lower connection member 99 which serves as a stopper mechanism operative in the upward and downward directions for limiting excessive displacements. Stopper member 5 also abuts against a peripheral wall of the lower connection member 99 which serves as a stopper mechanism limiting excessive displacement in a radial direction.

The heat-resistant rubber sheet member 2 is composed of EPDM or the like. An upper end of this rubber sheet member 2 is connected to the upper connection member 9, and a lower end thereof is integrally connected to the upper open end of the tubular metal member 22. The tubular metal member 22 has a flange 222 formed at a lower end, and the annular plate 15, fixed to the lower portion of the vibration-insulating rubber member 1, is also affixed to the upper open end (mouth portion) of the lower connection member 99 by clinching this flange 222. As shown in FIG. 1, the heat-resistant rubber sheet member 2, the vibration-insulating rubber member 1, and the tubular metal member 22 form a pre-determined space. A liquid fills this space, which space serves as the auxiliary liquid chamber 6 as shown in FIG. 1.

The vibration-insulating rubber member 1 is mounted on the upper connection member 9 independently of the heat-resistant sheet member 2, and is composed mainly of natural rubber. Therefore, the increase of its dynamic spring constant (Kd) for a vibration input of a high-frequency band can be suppressed. The heat-resistant rubber sheet member 2 serves as a diaphragm which is deformed in accordance with a change of the liquid pressure within the auxiliary liquid chamber 6.

The annular plate 15 has an annular ridge portion having an inverted U-shaped cross-section. The orifice 4 is formed by an outer peripheral surface of this annular ridge portion and an inner peripheral surface of the tubular metal member 22. The main liquid chamber 3 communicates with the auxiliary liquid chamber 6 through the orifice 4. The stopper member 5 is located within the main liquid chamber 3. The stopper member 5 has a generally conical-shape and is connected to one end of the connecting bolt 91 which is mounted on the upper connection member 9 for connection to the vibrating member. Between the stopper member 5 and the peripheral wall of the lower connection member 99, an annular orifice is formed where the resonance frequency is set to 100 to 600 Hz; therefore, it is possible to make the stopper member 5 function as an agitator plate.

The stopper member 5 forms an internal stopper of the liquid sealed-type vibration-insulating device. A rubber-like elastic member is affixed to the lower end portion (outer peripheral portion) of the stopper member 5 over an entire circumference. More specifically, the lower end portion of the stop member 5 is completely covered with portions 51, 52 and 59 of the rubber-like elastic member over the entire circumference of the lower end portion of the stopper. The upper portion 51 abuts against the annular plate 15 forming a rebound stopper; the lower portion 52 abuts against the bottom of the lower connection member 99 forming a bound stopper (down stopper); and, the side portion 59 abuts against the side wall of the lower connection member 99 which serves as a stopper operative in the radial direction.

Figure 2:
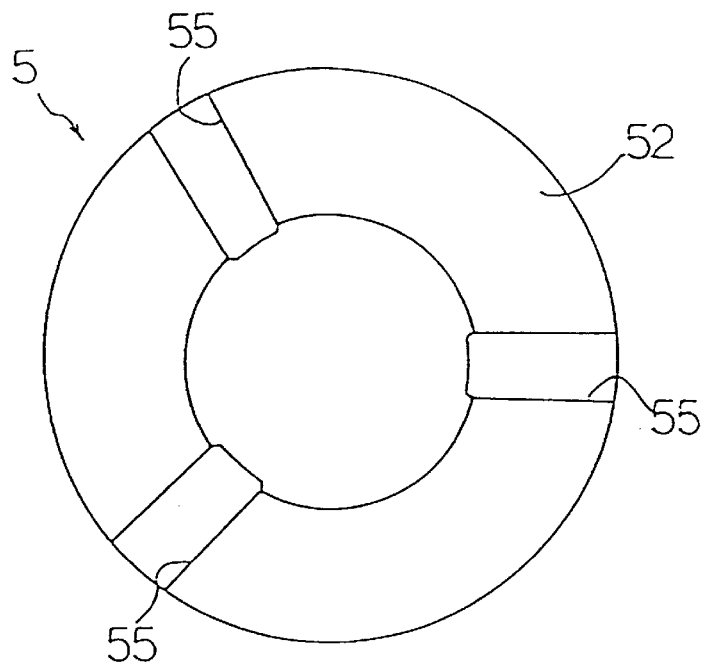
FIG. 2 is a bottom view of a stopper member.
Figure 3:
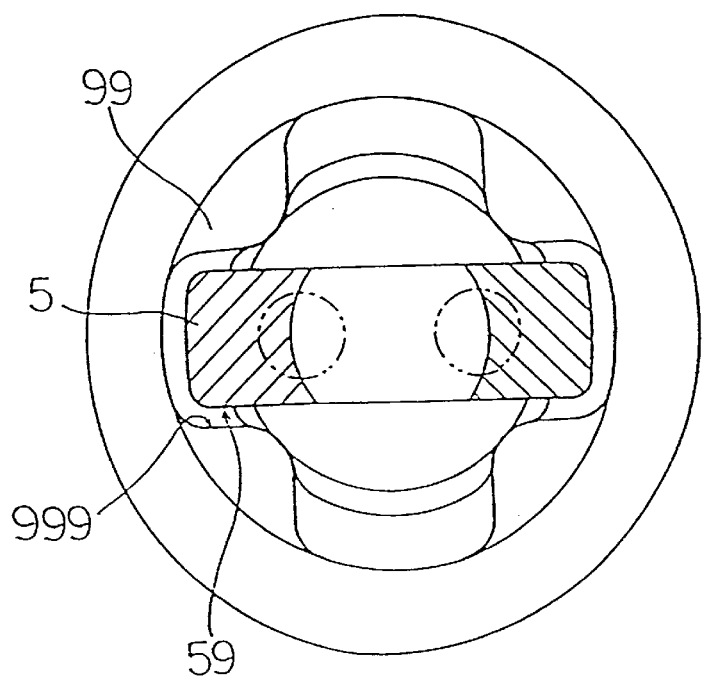
FIG. 3 is a top plan view of a modified stopper member.

The stopper member 5 has a stopper portion with an annular shape as shown in FIGS. 1 and 2. FIG. 3 shows a modified stopper member 5 having a stopper portion with a rectangular shape. The rectangular stopper portion will abut the vertical wall portions 999 formed by drawing four portions of the side wall of the cup-shaped lower connection member 99 which is mounted on the vehicle body. With this construction, when vibration input from a vibrating member acts in a radial direction relative to the stopper member 5, the stoppers 59 and 999 operate thereby suppressing the vibration. The function of the agitator plate is less effective in the stopper member 5 (shown in FIG. 3) having a rectangular stopper portion than the stopper member 5 having an annular stopper portion.

As shown in FIGS. 1 and 2, a plurality of slits or grooves 55 are formed in the lower portion 52 of the rubber-like elastic member. The stopper member 5 has a generally conical shape; the slits 55, formed in the lower portion 52, extend radially as shown in FIG. 2.

The stopper member 5 abuts against the bottom of the lower connection member 99 to serve as the down stopper and, in this condition, when a downward input is further applied, residing within the conical stopper member 5, is discharged to the exterior of the stopper member 5 through the slits 55. Therefore, an increase of the static spring constant when the stopper member 5 is near or in contact with the bottom of the lower connection member 99 (that is, when the down stopper operates) is suppressed. The slits 55 also reduce the suction force produced when the stopper member 5 moves apart from the bottom of the lower connection member 99.

In the liquid sealed-type vibration-insulating device of the above construction, when dealing with relatively low-frequency vibrations such as idling vibrations, the orifice 4, which allows communication between the main liquid camber 3 and the auxiliary liquid chamber 6, imparts a damping force to the liquid flowing between the main liquid chamber 3 and the auxiliary liquid chamber 6 so that a low dynamic spring constant is obtained thereby insulating such idling vibrations.

With respect to high-frequency vibrations (about 100 Hz to about 600 Hz) in addition to the damping operation of the vibration-insulating rubber member 1, the stopper member 5 causes the liquid in the main liquid chamber 3 to flow through the annular orifice between the stopper member 5 and the side wall of the lower connection member 99, thereby imparting a damping force to the liquid so that the dynamic spring constant will not increase yet insulating such high-frequency vibrations.

Furthermore, since the stopper mechanism for limiting an excessive displacement utilizes the space in the main liquid chamber 3 of the vibration-insulating device, there is no need to provide any external stopper. Therefore, the size of the vibration-insulating device may be reduced in both its height and radial directions.

Figure 4:
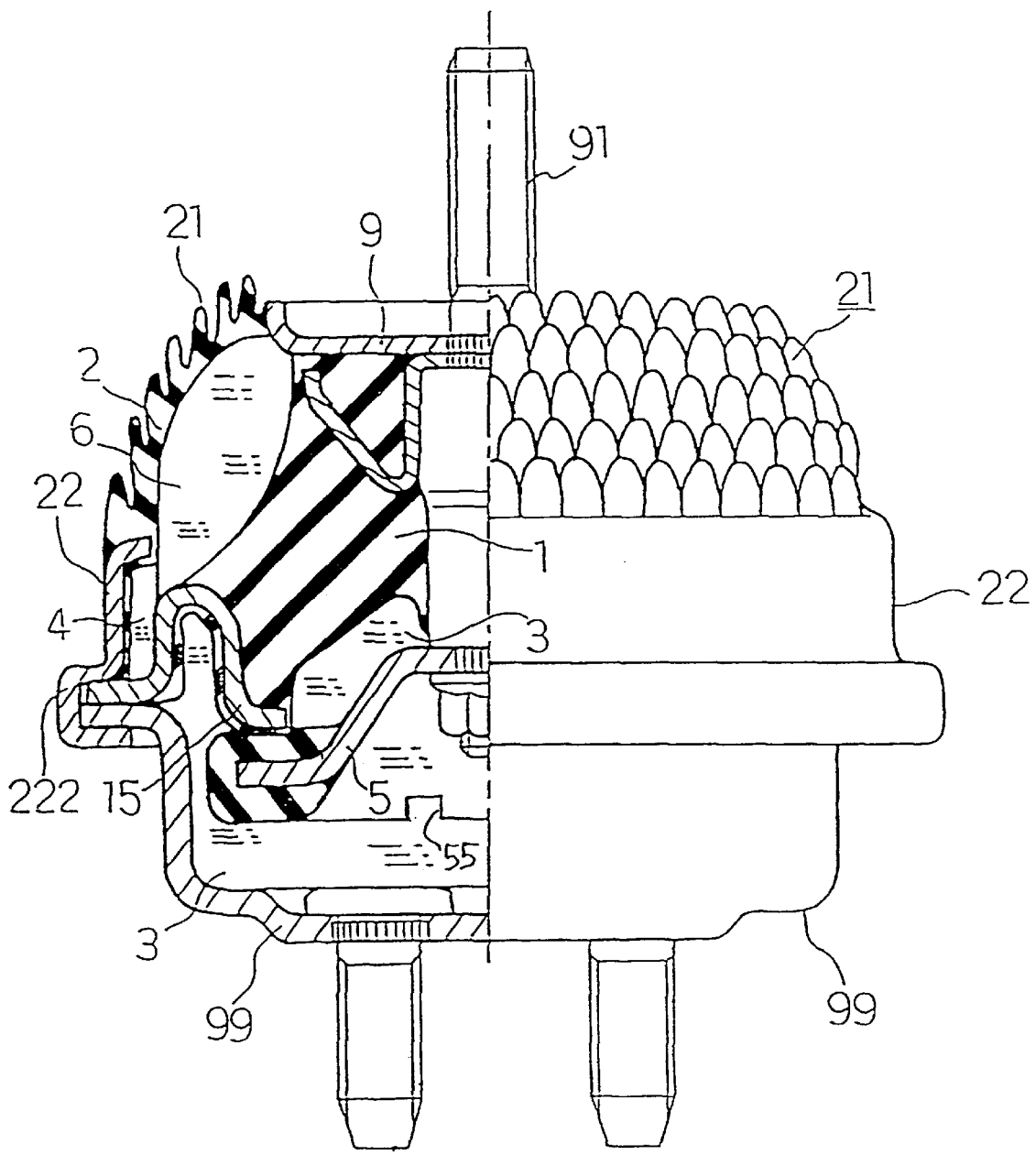
FIG. 4 is a half vertical cross-sectional view of another embodiment of a liquid sealed-type vibration-insulating device of the invention

In the above embodiment, the heat-resistant rubber sheet member 2 is exposed to the exterior and, therefore, there is a possibility that this rubber sheet member 2 will be damaged or broken by a splashed stone or the like. Another embodiment of the invention for reducing this possibility will be described with reference to FIG. 4.

Figure 5:
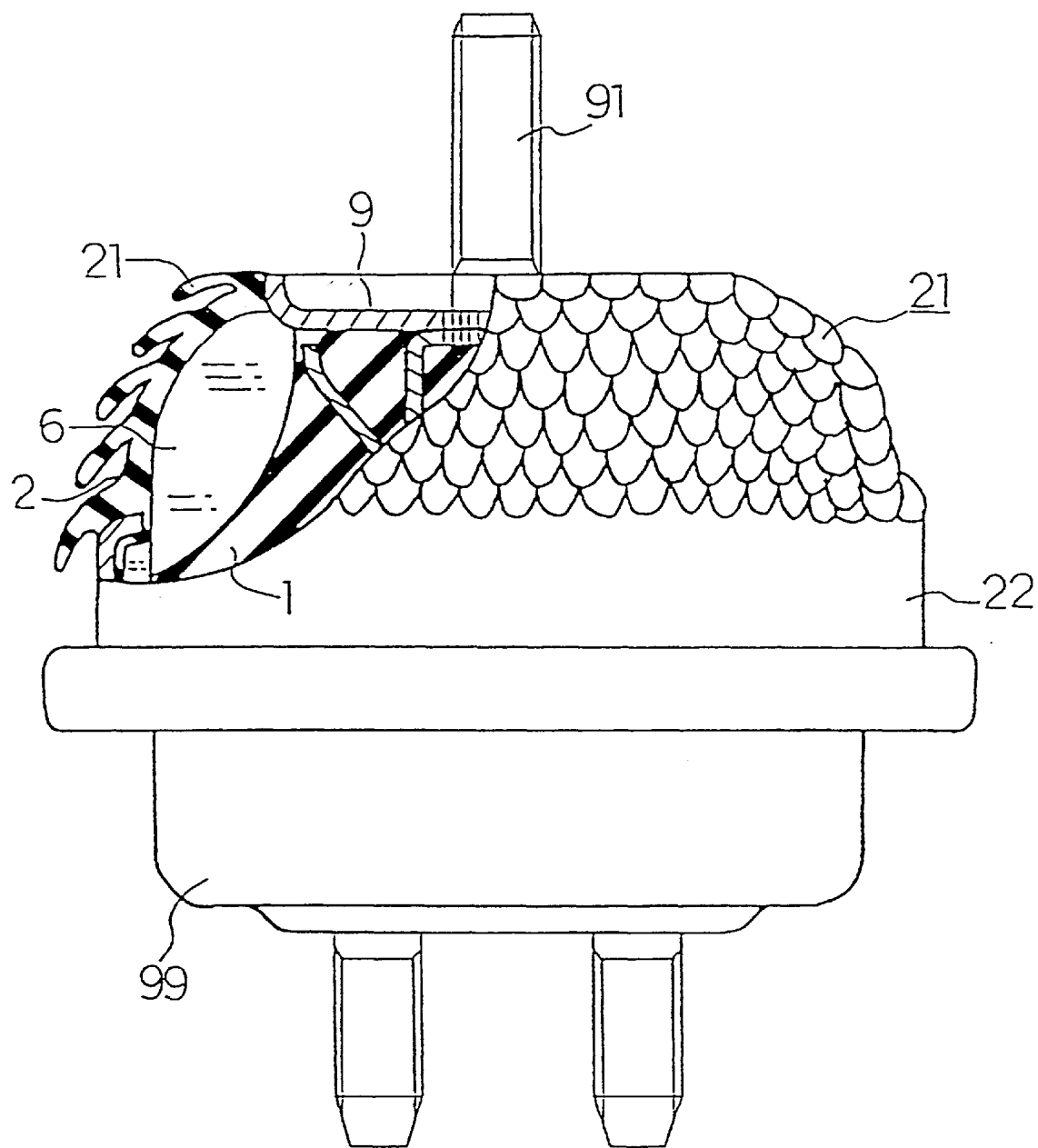
FIG. 5 is a partly-broken, front-elevational view of a liquid sealed-type vibration-insulating device having a modified protector.

A protector 21, comprising an aggregate of small pieces (scale-like members), is formed integrally with a heat-resistant rubber sheet member 2 in a squamation. A distal end portion of each small piece covers a proximal end portion of its vertically-adjacent small piece so that the small pieces overlap one another as with shingles on a roof. The protector 21 of this construction entirely covers the heat-resistant rubber sheet member 2 to protect the same. Depending on the manner of removing the molded protector 21 from a mold, the protector 21, comprising the scale-like small pieces, can take either the form shown in FIG. 4 in which the small pieces are directed upwardly or, alternatively, as in the form shown in FIG. 5 where the small pieces are directed downwardly. There is no major difference in function between the two embodiments shown in FIGS. 4 and 5, the small pieces overlap one another thereby protecting the heat-resistant rubber sheet member 2 from splashed stone or like debris.

Figure 6:
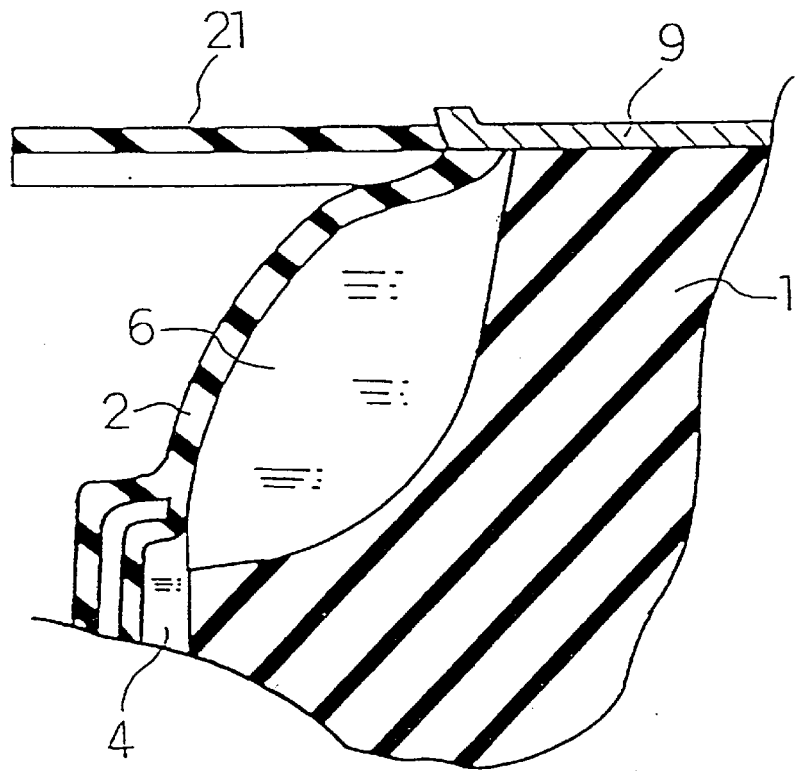
FIG. 6 is a cross-sectional view showing another modified protector.
Figure 7:
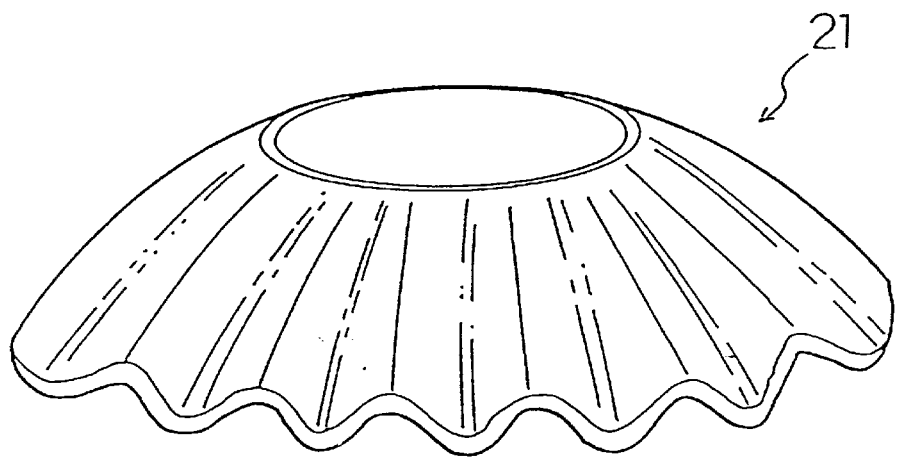
FIG. 7 is a perspective view of the protector of FIG. 6.

FIGS. 6 and 7 show a modified protector 221 formed of a single elastic member. As shown in FIG. 6, protector 221 has a disk-like shape and is formed with a plurality of pleats that extend radially from a central portion. This disk-like protector 221 is integrally secured by curing adhesive means or the like with the outer periphery of an upper connection member 9 and/or an upper end of a heat-resistant rubber sheet member 2. The protector 221, molded integrally with the upper connection member 9, is removed from a mold, and this protector 221 and the other component parts are assembled together to provide the liquid sealed-type vibration-insulating device. As a result, the outer peripheral portion of the protector 221 hangs down by its own weight, as shown in FIG. 7, so that the protector 221 assumes an umbrella-like configuration as a whole and encloses the heat-resistant rubber sheet member 2.

The shingle-like protector 221 can protect the heat-resistant rubber sheet member 2 from a splashed stone or the like without the need for increasing the thickness of the rubber sheet member 2. As a result, the heat-resistant rubber sheet member 2 will not affect the overall dynamic spring constant of the liquid sealed-type vibration-insulating device, and the dynamic spring constant in the high-frequency band of the liquid sealed-type vibration-insulating device can be kept to a low level.

The protector, formed by the single elastic member, can be molded together with the heat-resistant rubber sheet member 2 when the heat-resistant rubber sheet member 2 is molded, and besides a mold for forming the protector and the rubber sheet member 2, can be of a simple construction.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A liquid sealed-type vibration-insulating device comprises:

an upper connection member to be mounted on a vibrating member;

a lower connection member of a cup-shape to be mounted on a member on a vehicle body;

a vibration-insulating rubber member located between the upper and lower connection members for receiving vibrations from the vibrating member;

an annular plate fixed to a lower portion of the vibration-insulating rubber member;

a tubular metal member connecting the annular plate to an upper open end of the lower connection member;

a heat-resistant rubber sheet member which is connected between an upper open end of the tubular metal member and the upper connection member, and covers the vibration-insulating rubber member;

a main liquid chamber which is formed by the vibration-insulating rubber member and the lower connection member, and is located beneath the vibration-insulating rubber member;

an auxiliary liquid chamber which is formed by the vibration-insulating rubber member and the heat-resistant rubber sheet member, and is surrounding an upper side of the vibration-insulating rubber member;

a liquid filled in the main liquid chamber and the auxiliary liquid chamber;

an orifice communicating the main liquid chamber with the auxiliary liquid chamber; and a stopper member which is connected to the upper connection member, and is located within the main liquid chamber, wherein the stopper member abuts against the annular plate and a bottom of the lower connection member serving as a stopper mechanism operative in upward and downward directions, and also abuts against a side wall of said lower connection member serving as a stopper mechanism operative in a radial direction.

2. A device according to claim 1, in which the annular plate has an annular ridge portion of an inverted U-shaped cross-section, and the orifice is formed by an outer peripheral surface of the annular ridge portion and an inner peripheral surface of the tubular metal member.

3. A device according to claim 1, in which an annular orifice is formed between the stopper member and a side wall of the lower connection member, and a resonance frequency of said annular orifice is set from 100 to 600 Hz.

4. A device according to claim 1, in which a rubber member is affixed to an outer peripheral portion of the stopper member over an entire circumference thereof, and at least one slit is formed in a surface of said rubber member for abutment against a bottom of the lower connection member, and extends radially from the rubber member, and the slit allows the liquid to flow through when the rubber member is brought into abutment against the bottom of the lower connection member.

5. A device according to claim 1, in which a protector, made of an elastic material, is formed integrally with the heat-resistant rubber sheet member on an outer side of the heat-resistant rubber sheet member.

6. A device according to claim 5, in which the protector comprises a large number of scale-like members formed integrally with the heat-resistant rubber sheet member.

7. A device according to claim 6, in which the scale-like members are so arranged that a proximal end portion of each scale-like member overlaps a distal end portion of its adjacent scale-like member.

8. A device according to claim 5, in which said protector comprises an umbrella-like member provided to cover the heat-resistant rubber sheet member.

* * * * *